United States Patent [19]

Waters et al.

[11] 4,375,099
[45] Feb. 22, 1983

[54] LINK PERFORMANCE INDICATOR WITH ALTERNATE DATA SAMPLING AND ERROR INDICATION GENERATION

[75] Inventors: George W. Waters, Indialantic; Michael B. Luntz, Melbourne Beach, both of Fla.

[73] Assignee: Harris Corporation, Melbourne, Fla.

[21] Appl. No.: 138,456

[22] Filed: Apr. 8, 1980

[51] Int. Cl.³ .............................................. G06F 11/30
[52] U.S. Cl. .................................................... 371/6
[58] Field of Search .................... 371/6, 5; 307/358 X

[56] References Cited

U.S. PATENT DOCUMENTS

| | | | |
|---|---|---|---|
| 3,214,700 | 10/1965 | Hook | 371/6 X |
| 3,568,150 | 3/1971 | Games | 371/5 X |
| 3,638,183 | 1/1972 | Prögler et al. | 371/6 |
| 3,721,959 | 3/1973 | George | 371/5 |
| 4,034,340 | 7/1977 | Sant'Agostino | 371/5 X |
| 4,234,954 | 11/1980 | Lange et al. | 371/6 |

*Primary Examiner*—David H. Malzahn
*Attorney, Agent, or Firm*—Craig and Antonelli

[57] ABSTRACT

A link performance indicator card analyzes incoming analog data from a demodulator on a bit by bit basis and compares the individual bit amplitudes with a fraction of the average bit signal levels. The data bits that lack sufficient amplitude to be clear-cut "high" or "low" pulses are detected as "pseudo-errors". A bit error rate gate signal controls the detectors in order that circuits operate for only one burst or part of a burst per frame always from the same earth station. A comparator is used for comparing the output of the averaged incoming analog signal with the instantaneous value of the analog signal. Alternate clocking signals are used to perform the averaging function and the comparison function of the average signal with the instantaneous signal. This alternation of the signals frees the comparison operation from the influence of any loading on the circuit. The sample points of the incoming analog signal are adjustable by use of delays on the clock signals fed into the circuits.

12 Claims, 4 Drawing Figures

LINK PERFORMANCE INDICATOR WITH ALTERNATE DATA SAMPLING AND ERROR INDICATION GENERATION

FIELD OF THE INVENTION

The present invention relates to communication systems, especially satellite communication systems, and is particularly directed to a scheme for providing a measure of the bit errors in a demodulated bipolar signal burst.

BACKGROUND OF THE INVENTION

In an effort to ensure the intended performance of a communication system, namely, the ability of a receiving station to successfully recover the information that was originally transmitted from a transmission station, the system is customarily provided with error or distortion monitoring equipment from which an indication of errors in the received signals may be obtained.

Examples of error detection circuits that have been proposed include those employing threshold detectors which monitor the variation of the demodulated signal above or below a prescribed threshold. For instance, adjustment of the threshold value may be required where the signal level undergoes long-term fluctuations that are not due to interference. When employed in a phase modulation system, operation of the threshold detector depends primarily on the use of automatic gain control circuitry to adjust the signal relative to a manually set threshold. An obvious drawback to manually setting the signal level relative to the threshold value is that changes in the channel or link over which the communication is conveyed directly impact on the manual setting.

To overcome the shortcomings of manual adjustment, there have been proposed threshold detectors that are adjusted automatically. One such circuit which is described in U.S. Pat. No. 3,638,183 to Progler et al. adjusts the detector in dependence upon the peak value of a received signal that persists for a prescribed period of time. This circuit employs a threshold circuit including a network, the transfer function of which is less than unity, connected in parallel with the series connection of a peak value rectifier and a memory delay. The memory delay transmits only those level fluctuations which persist in excess of a prescribed time interval. The memory delay and the transfer network are connected to a comparator which generates an output signal when the values of the outputs of the memory delay and the transfer network differ by more than a fixed amount.

Now, although the Progler et al approach seeks to provide automatic threshold adjustment, it suffers from the drawback that it averages gain over a considerable period of time, so that it is not readily employable in any type of communication system.

In a TDMA (Time Division Multiple Access) satellite communication system, the signal demodulator receives a large number of bursts of information, and usually, the bursts of information from a particular transmitting station occur once per frame. The conventional averaging circuits tend to average the received gain over many bursts, and therefore, cannot individually control the amplitude of a burst from a specific station. Yet, in order to provide an accurate estimate of error for a particular link, it is an a priori requirement that only the bursts from an individual station be measured. In order to measure the bit amplitudes accurately, the incoming signal waveform must be measured at the same sample points that are used for making bit decisions. These requirements of such a communication system further demonstrate the shortcomings of a threshold adjustment circuit as described in the above referenced Progler patent, wherein the threshold value is established in accordance with changes in the level of the received signal that persists for a relatively long period of time. The measured input signal may be adversely affected by waveform distortion, which waveform distortion is not reflected in the threshold value with which it is compared, since the threshold depends upon changes in the level of the received signal which persists over a long time period. At the data rates involved in satellite communications, the waveform distortion would not necessarily persist long enough for the Progler system to properly adjust its threshold value, particularly where the distortion is generated by switching operations in the signal recovery circuitry.

SUMMARY OF THE INVENTION

In accordance with the present invention there is provided a signal error measurement system that is particularly useful for high data rate communication environments, such as satellite transmission systems, and which is selectively controllable so as to be capable of measuring errors during a time window associated with a specified data burst.

For this purpose, the error detection scheme of the present invention includes signal amplitude measurement circuitry that samples a received analog bipolar signal in synchronism with a timing signal under the control of which decisions as to data values are made. These samples are compared with a threshold that is set at some fraction $\alpha$ of an accumulated average of the data to provide a measure of "pseudo errors" in the received data. These "pseudo errors" are identified as occurring at those data (bit) positions in the received signal where the signal amplitude is less than the fraction $\alpha$ of the average of the samples. Namely, since the received analog signal is bipolar, it is expected that at any point along the signal train the signal amplitude should be at a well defined high (positive polarity) or low (negative polarity) level. At those points or locations (of measurement, usually mid-bit) within the signal train where the amplitude of the signal sample is insufficient to be at a clear cut high or low level, a pseudo error is identified. The pseudo errors are theoretically related to an estimate of the real errors, so that the fidelity of the received data to that originally transmitted may be evaluated on the basis of these pseudo errors.

The implementation of a preferred embodiment of the invention includes a controlled switching circuit that operates in synchronism with a clock derived from transitions in the received signal and in response to the polarity of the analog signal, to selectively steer the respective positive and negative polarity portions of the analog signal to separate sample and averaging circuits. This selective steering effectively full wave rectifies the bipolar analog signal to permit the use of inexpensive sample and hold circuits and differential comparators, while affording the processing of high data rate signals that could not be accomplished with a conventional full wave rectifier approach. The sample and averaging circuits are controlled by the same clock with which bit decisions on the received signal are controlled and produce a reference level that is an average of accumulated samples of the respective positive and negative polarity portions of the analog signal. The amplitudes of the respective positive and negative portions of the incoming signal are compared in a comparator with the respective reference levels for the positive and negative representative accumulated averages of the samples, and the comparator generates an output for those samples that have an amplitude greater than the reference against which they are compared. The output of the comparator is gated, by way of a clocked flip-flop, in synchronism with the system clock (at mid bit decision times) to produce the pseudo error signals at those clock times where the comparator produces no output. If the comparator produces an output at the clock time of interest (a sample time) no pseudo error signal is generated.

The operation of the sampling circuitry is such that distortion (a glitch) is introduced into the analog signal being applied to a respective comparator at the time the signal is sampled, so that the amplitude of the signal applied to the comparator at the time the pseudo error decision is made may lead to an erroneous pseudo error decision for that sample. To prevent this possibility, the clock signals for controlling signal sampling and pseudo error decision times are applied alternately to the sample circuitry and the flip-flop gate. As a result, each pseudo error decision will be based upon the non-distorted received signal sample of interest and the accumulated average of signal samples will be determined by every other signal sample.

The error detector circuit according to the present invention is further provided with an operation control gate so that it may be selectively placed into operation only during a specified time window associated with the transmission burst or a portion of the transmission burst from a particular earth station, as in a TDMA satellite communication system. This selective gating ensures that the pseudo error estimate is associated with only the particular channel of interest, and is not erroneously influenced by signal bursts from other sources as may occur if the threshold level for the pseudo error comparison corresponds to an accumulated sample average based on many bursts.

The above described and other features and advantages of the present invention will become more apparent from the following detailed description of the present invention when taken in conjunction with the accompanying drawings.

DETAILED DESCRIPTION

Figure 1:
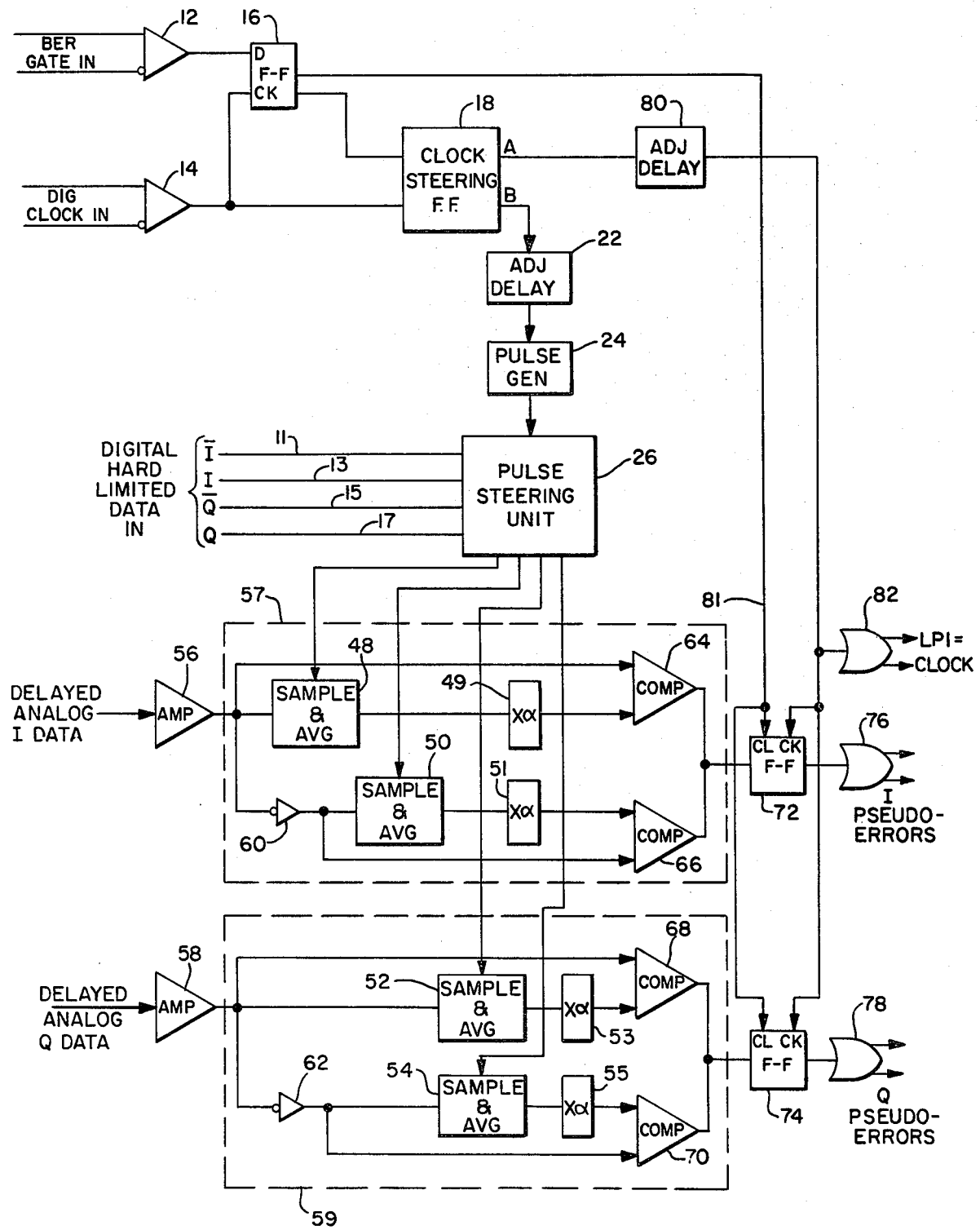
FIG. 1 is a schematic block diagram of a link performance indicator in accordance with the present invention.

Referring now to FIG. 1 there is shown a general circuit diagram of a link performance indicator in accordance with the present invention. For purposes of presenting an illustrative embodiment, the modulation scheme, from which the signal input to the circuit of FIG. 1 is derived, is assumed to be QPSK, so that from the demodulator there are obtained both in-phase (I) and quadrative (Q) analog signal components. The signals are bipolar with the respective positive and negative levels representing prescribed binary states. The type of modulation and the particular encoding technique employed are not germane to the implementation and operation of the invention and will not be described here. The type of modulation and data representation scheme chosen could be of any other suitable format consistent with present day communication techniques and adaptable to the invention, to be described in detail below. However, as explained briefly above and as depicted in the drawings, a quadrature modulation scheme, familiar to those skilled in the art, is provided as an example.

At the output of the demodulator (not shown) the analog data signals for the I and Q channels, are coupled through respective delay units (not shown) as inputs to amplifiers 56 and 58. Amplifiers 56 and 58 are coupled to sets of threshold detection and comparison circuits 57 and 59. Each of these threshold detection and comparison circuits, under the control of switching or selection signals produced by pulse steering circuit 26 (to be described below), operates on the I and Q analog data signals, so as to provide a threshold for pseudo error comparison that adapts itself to variations in the signal for the data burst of interest and provides an output in response to the amplitude level of a signal sample exceeding that threshold.

The outputs of threshold detection and comparison circuits 57 and 59 are selectively gated or sampled by a pair of flip-flops 72 and 74, the Q outputs of which represent the occurrence of a pseudo error in the analog data signal, as will be described more fully below. Each of the threshold detection and comparison circuits contains a pair of signal processing or analysis sections, one for the non-inverted version of the signal and one for the complement or inverted version of the signal. Although the description to follow will focus only upon circuit 57 for the I channel component, it should be understood that a similar explanation applies to the Q channel components contained in circuit 59.

As mentioned briefly above, each threshold detection and comparison circuit has a pair of signal analysis sections. The non-inverted signal section of circuit 57 contains a sample and average circuit 48, voltage divider or scaling circuit 49 and a comparator 64. Similarly, the inverted signal section of circuit 57 contains sample and average circuit 50, scaler 51 and comparator 66, as well as an inverter 60 that produces an inverted replica of the data signal for the I channel.

Specifically, from the output of amplifier 56, the delayed analog data signal for the in-phase channel (I) is coupled directly to one input of a comparator 64, the signal input of sample and average circuit 48 and inverter 60. The output of inverter 60, corresponding to the complement Ī of the delayed analog data signal for the in-phase channel (I), is applied to the signal input of sample and average circuit 50 and one input of comparator 66. (FIG. 4, to be referenced below, illustrates a representative portion of a typical bipolar analog data signal for the I channel; portion (a) is the non-inverted signal output of amplifier 56 and portion (b) is the inverted signal output of inverter 60.)

Sample and average circuits 48 and 50 are selectively gated or enabled by individual outputs of a pulse steering unit 26 (to be described in detail below with reference to FIG. 2), so as to sample the analog levels of their signal inputs for the duration of the steering pulses and provide an average of their accumulated samples. (The configuration and operation of an individual sample and average circuit will be described in detail below with reference to FIG. 3). These average values are coupled through respective buffer amplifiers and applied to scaling voltage dividers 49 and 51 respectively. The scaling voltage dividers are used to provide a suitable threshold reference level for operation of comparators 64 and 66. The output of each comparator is high unless the instantaneous signal level exceeds the average reference output of the scaling circuit, at which occurrence the comparator toggles providing a low level to the D input of its associated gating flip-flop. The output of each of comparators 64 and 66 is coupled via a wired or to the D input of the same flip-flop 72. Since each comparator operates exclusively on one of the complementary polarity portions of the data signal, which cannot overlap in time, the possibility of both comparators 64 and 66 triggering simultaneously does not exist, so that a single flip-flop may be used to gate the output of each comparator 64 and 66. Thus, as long as the signal level output of the input amplifier exceeds the reference threshold, the D input to flip-flop 72 is low, so that its Q output, which is initially low on clearing, remains low.

Figure 3:
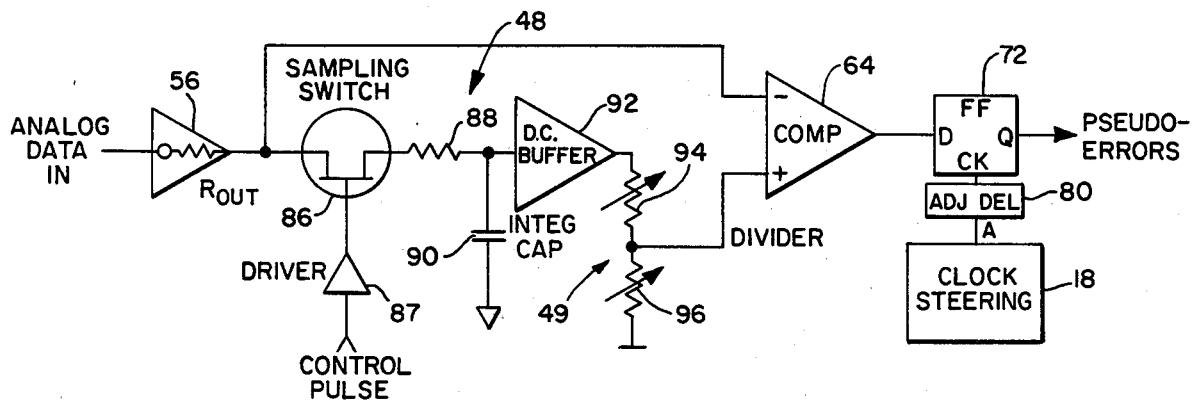
FIG. 3 is circuit diagram of a portion of FIG. 1 showing the detailed configuration of sampling and averaging circuits and output voltage divider.

Referring now to FIG. 3, the configuration and operation of an individual threshold detection and comparison circuit will be described in detail. Although the illustration in FIG. 3 and the accompanying description below relate particularly to the components in the non-inverted signal section of circuit 57, it should be understood that the explanation applies equally well to the inverted signal section and to circuit 59 for the Q channel also.

Figure 4:
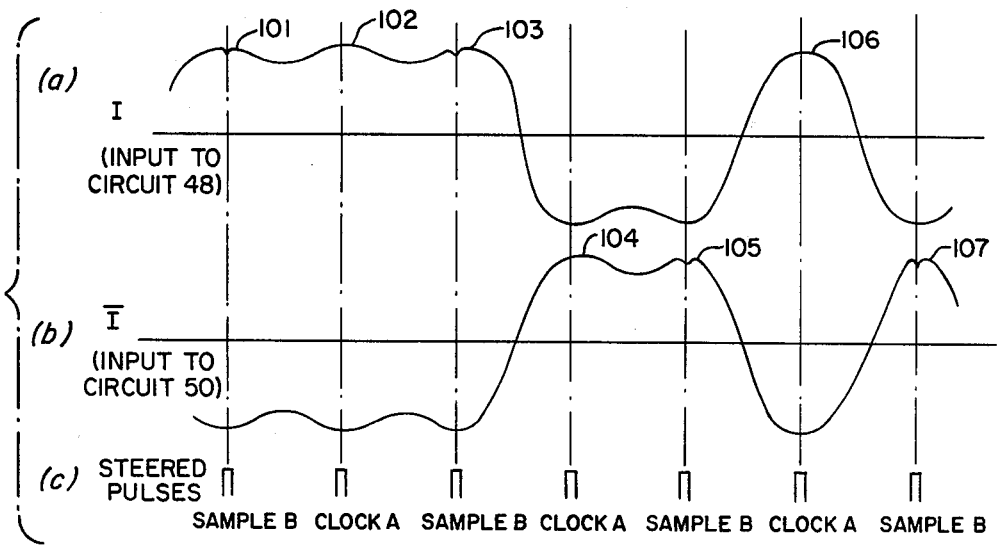
FIG. 4 is a waveform diagram of exemplary incoming bipolar analog signals showing the sampling times and the pseudo error gating clocks.

The I output of amplifier 56 may be represented by the signal waveform (a) shown in FIG. 4. This signal is coupled directly to one input (−) of comparator 64 and to the source (drain) of FET switch 86. The drain (source) of FET switch 86 is coupled to an integrator or sample storage circuit comprised of resistor 88 and capacitor 90. The voltage across capacitor 90 is buffered via amplifier 92 and applied to a scaling circuit 49 containing variable resistors 94 and 96, the junction point of which is coupled to a second (+) input of comparator 64. The gate of FET switch 86 is coupled to the output of a pulse driver 87, the input of which is coupled to receive one of the control pulses from pulse steering unit 26. During the application of a control pulse from unit 26 to its gate, the source-drain current path of FET switch 86 is conductive, so as to couple a portion or sample (as determined by the width of the control pulse) of the signal to the integrator for dynamically adjusting or updating the value of the reference voltage supplied to threshold comparator 64. In the absence of a control pulse from unit 26, the source-drain path of FET switch 86 is effectively non-conductive, so that no adjustment of the reference level based on signal input takes place. Whenever the amplitude of the output of amplifier 56 exceeds the reference level that has been dynamically adjusted during the signal burst in response to control pulses applied to FET switch 86, comparator 64 is toggled, applying a low level to the D input to flip-flop 72. Otherwise, the output of comparator 64 remains high.

Referring again to FIG. 1, the manner in which the detector timing or clock signals are generated to control the operation of the link performance indicator will be explained. The basic clock signal in accordance with which the events in the detector are controlled is obtained in a conventional manner by a transition detector (not shown) that provides a digital clock input to amplifier 14 synchronized with the transitions or polarity excursions in the input analog signal. This clock signal is applied to the clock input of flip-flop 16, and to a toggle-connected steering flip-flop 18. The D input of flip-flop 16 is coupled to receive a burst length or bit error rate measurement interval defining signal applied to buffer 12. This signal may be synchronized with the beginning and end of the data burst or fall within the burst. The purpose of this gate signal is to define the time interval during which the pseudo error analysis is to be conducted.

The Q output of flip-flop 16 goes high for a length of time defined by this interval signal and is synchronized with the detector's clock supplied at the output of amplifier 14. The Q output of flip-flop 16 is coupled to the clear (CL) outputs of flip-flops 72 and 74. During a burst measurement interval, the high level at the Q output of flip-flop 16 permits flip-flops 72 and 74 to be controlled in dependence upon the outputs of the comparators. Toggle-connected clock steering flip-flop 18 responds to the clock from buffer 14 to supply system clock signals to be described below, for controlling indicator operation during a measurement interval.

Figure 2:
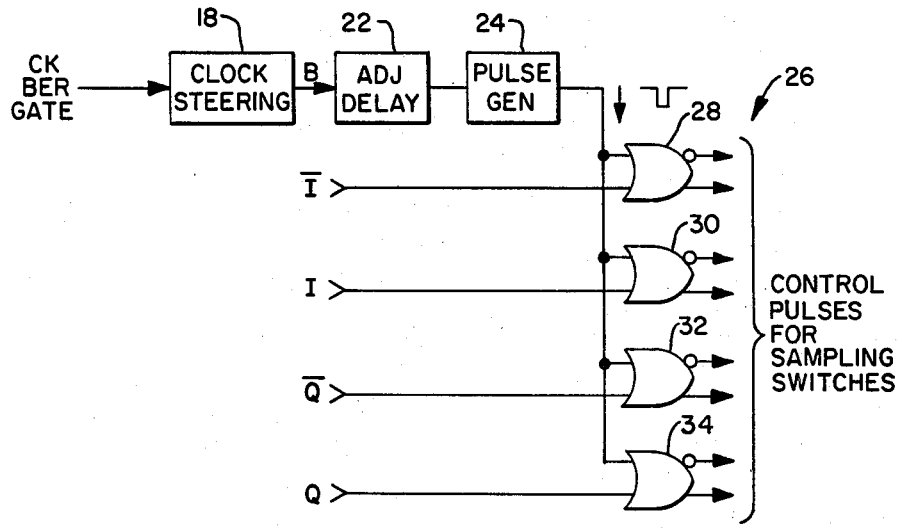
FIG. 2 illustrates, in greater detail, the pulse steering circuit of FIG. 1.

As was described briefly above, a fundamental system clock derived from clock recovery circuitry in the demodulator is coupled through buffer amplifier 14 to a flip-flop 16 and to one clock steering flip-flop 18. When toggled by successive clock signals, the Q output of clock steering flip-flop 18 supplies a first clock A signal through an adjustable delay 80 to the clock inputs of gating flip-flops 72 and 74 and to a gate 82, the output of which is identified as the LPI clock. A second clock signal B is produced at the $\overline{Q}$ output of clock steering flip-flop 18, clock signal B alternating in time with clock signal A. These alternating clocks A and B are produced to prevent simultaneous signal sampling and pseudo error flip-flop gating for an analog signal of interest; namely, the threshold detection and comparison circuitry (specifically, the sample and average circuits) are clocked at times different from (alternately with) the times at which the gating flip-flops are clocked in order to avoid a glitch or distortion that occurs in the analog signal during sampling, from causing an erroneous output from a comparator. This is clearly shown in FIG. 4 where flip-flop gating clock A is interleaved or alternates with sampling clock B. Sampling clock B is coupled through an adjustable delay 22 to a pulse generator (one shot) which outputs a very narrow pulse to be applied to pulse steering unit 26. Pulse steering unit 26, a detailed configuration of which is shown in FIG. 2, is comprised of a plurality of gates 28–34, to one input of each of which the narrow sampling pulse output of pulse generator 24 is applied. A second input of respective gates 28–34 is coupled to lines 11–14. The I and Q outputs of the demodulator are hard limited and inverted to provide gate control signals identified as $\overline{I}$, I, $\overline{Q}$ and Q signals applied via lines 11, 13, 15, 17 to gates 28–34 respectively. The outputs of these gates are applied as the outputs of the pulse steering unit 26 to the gate control inputs of sample and average circuits 48, 50, 52, and 54. Thus, each narrow sampling pulse produced by pulse generator 24 will be selectively steered through gates 28–34 depending upon the states of enabling states of lines 11–17 as defined by the polarity states of the in-phase and guadrature signals from the demodulator.

Considering now the overall operation of the system shown in FIG. 1, in the absence of an enabling BER gate window signal associated with the burst to be monitored, the D input to flip-flop 16 is low so that its Q output is low thereby disabling clock steering flip-flop 18 and maintaining flip-flops 72 and 74 cleared; the system is therefore effectively in a quiescent state. In response to receipt of a data burst of interest to be monitored the demodulator supplies a BER gate signal through buffer amplifier 12 to the D input of flip-flop 16, so that its Q output changes state in synchronism with the next clock signal from buffer 14, thereby permitting flip-flops 18, 72 and 74 to be clocked. Toggle-connected flip-flop 18 begins supplying alternate clock signals, from which the sampling and flip-flop gating pulses A and B, coincident with the bit decision times, shown at (c) in FIG. 4, are produced.

Again, considering the in-phase channel alone for purposes of simplification, the I data signal shown at (a) in FIG. 4 is coupled from amplifier 56 to an input of comparator 64, to sample and average circuit 48 and to inverter 60. Inverter 60 produces the complement or inverted version $\bar{I}$ of the output of amplifier 56 and applies this $\bar{I}$ signal, shown at (b) in FIG. 4, to sample and average circuit 50 and to one input of comparator 66. The operational scenario for the portion of the in-phase data signal shown in FIG. 4 proceeds as follows. At time 101, the polarity of the I signal is high (positive), while that of the $\bar{I}$ signal is low; accordingly the state of line 13 applied to gate 30 causes the pulse output of pulse generator 24 to be steered to gate FET switch 86 within sample and average circuit 48. As a result, the amplitude level of the I signal is sampled for the duration of sampling pulse B and stored, as explained above in conjunction with the description of FIG. 3. This sampling operation causes a glitch in the amplitude level of the analog signal as shown at time 101, so that the output of comparator 64 may not be accurately representative of whether or not the actual analog data signal exceeds the reference. Because of the alternate clocking of the sampling pulses B and gating flip-flop pulses A, however, flip-flops 72 and 74 are not clocked at time 101, so that no pseudo error signal can be produced at this time.

At time 102, clock A is applied to gating flip-flops 72 and 74. If, at this time, any of the comparators has failed to toggle, indicating an analog signal level less than that sufficient to be recognized as a clear cut high or low level, the gating flip-flop associated with that comparator will change state, causing a pseudo error signal to be produced for the channel of interest via gate 76 for the in-phase channel or via gate 78 for the quadrature channel.

Subsequently, at times 103–107, further sample clock pulses B and flip-flop gating clock pulses A are produced for sampling and read out, in the manner described above, as shown in FIG. 4. It is to be observed that at sampling times 105 and 107, the level of the in-phase signal component, specifically the state of the inverted, hard-limited signal on line 11, enables gate 28, to steer the sampling pulse output of pulse generator 24 to sample and average circuit 50, so that the glitch appears in the inverted in-phase component.

The above sequence of events continues until the end of the burst measurement interval, as defined by the BER window, at which time the Q output of flip-flop 16 goes low again (in synchronism with the clock pulse from buffer 14), clearing flip-flops 18, 72, and 74.

As will be appreciated from the foregoing description, the link performance indicator circuit of the present invention offers several advantages over conventional threshold-based error detection schemes. In a data signal burst communication scheme, a conventional AGC circuit averaging a received signal over all the received bursts will not correct level variations in a single received burst. The adaptive threshold in the link performance indicator that is responsive to a particular burst of interest enables the circuit to compensate for the level changes for that burst. By time division of the sampling and gating pulses, interference between the operation of the sampling circuit and the gating of the results of the comparison operation is avoided. Also of significance is the circuit configuration for analyzing the input signal and its inverse in conjunction with the pulse steering logic. The conventional approach of simply using a standard full wave rectifier is difficult or substantially impossible to implement with good accuracy at high data rates. By operating on the separate polarities of the data signal through the use of separate inverted and non-inverted channels, under the control of the pulse steering logic, wherein the implementations for each channel is the same and to the threshold detector and comparison circuit, the signals are of the same polarity, the same result of full wave rectification is obtained, but through a more easily implemented configuration.

While we have shown and described an embodiment accordance with the present invention, it is understood that the same is not limited thereto but is susceptible to numerous changes and modifications as known to those skilled in the art and we therefore do not wish to be limited to the details shown and described herein but intend to cover all such changes and modifications as are encompassed by the scope of the appended claims.

What is claimed is:

1. A data transmission error detection system for analyzing incoming analog data signals representing a sequence of equal amplitude ones and zeroes, comprising:

gate control means for generating a repetitive window defining gating signal at repetitive selected sampling times within a data burst from a particular transmitting station occurring at a regularly-spaced rate;

pulse signal averaging means, controlled by a gating signal generated by said gate control means and coupled to receive an incoming analog data signal, for generating an output corresponding to the average level of successive samples of said incoming analog data signal of a like polarity; and comparator means for comparing a prescribed fraction of the output of said pulse signal averaging means with the level of said incoming analog data signal at repetitive respective comparison times and outputting a pseudo-error indication signal in response to the level of said incoming analog data signal failing to exceed the level of said prescribed fraction of the output of said pulse signal averaging means at a respective comparison time.

2. A data transmission error detection system as defined in claim 1, wherein said incoming data signals are bi-polar signals, and wherein said pulse signal averaging means includes a normal polarity pulse signal averaging section for generating an output corresponding to the average level of successive samples of an incoming data signal of normal polarity and an inverted polarity pulse signal averaging section for generating an output correspond to the average level of successive samples of an incoming data signal of inverted polarity and wherein said gate control means includes pulse steering means for selectively coupling gating signals to said normal and inverted polarity pulse signal averaging sections in accordance with the polarity of the incoming data signal.

3. A data transmission error detection system as defined in claim 2, wherein said comparator means includes first and second comparator circuits and said normal and inverted polarity pulse averaging sections of said pulse signal averaging means comprise respective first and second sample and average circuits and respective voltage dividers connected to the outputs thereof, the outputs of the respective voltage divider circuits being connected to one input of said first and second comparator circuits, respectively, the other input of said first and second comparator circuits and said first and second sample and average circuits each receiving the incoming data signals, said pulse steering means including means for enabling said first sample and average circuit for data signals of one polarity and for enabling said second sample and average circuit for data signals of the other polarity.

4. A data transmission error detection system as defined in claim 1, wherein said gate control means includes means for generating first and second alternating gating signals, said first gating signals being coupled to control said pulse signal averaging means and said second gating signals being coupled to said comparator means to define said repetitive respective comparison times.

5. A data transmission error detection system as defined in claim 4, wherein said gate control means includes means for generating a series of clock pulses correlated to said incoming data signals and clock steering means for steering alternate clock pulses as said first and second gating signals into first and second streams representing first and second clock pulses.

6. A data transmission error detection system as defined in claim 5, wherein said comparator means includes a comparator and gate means connected to the output of said comparator controlled by said second clock pulse from said gate control means for gating out said error indicator signal.

7. A data transmission error detection system according to claim 5 or claim 6, wherein said pulse signal averaging means comprises a sample switch controlled by said first clock pulse from said gate control means and an integrating circuit and a voltage divider for providing a DC level corresponding to the average data amplitude determined during the times said sampling switch is enabled by said first clock pulse, said averaging circuit being only enabled for the duration of said second clock pulse.

8. A data transmission error detection system as defined in claim 5, further including adjustable delay means connected to the outputs of said clock steering means providing said first and second streams of clock for establishing the times of occurrence of said clock pulses with respect to said incoming data signals.

9. A data transmission error detection system for analyzing incoming signals which were transmitted with a predetermined value for a signal characteristic such as phase, frequency, or amplitude, comprising:
sampling means for producing an average value of a predetermined characteristic of said incoming signal in response to a first clock indication signal;
comparison means for comparing the output of said sampling means with said incoming signal and for producing an error signal when said incoming signal differs from a prescribed fraction of the output of said sampling means by more than a predetermined amount;
gating means for gating out the output of said comparison means in response to a second clock indication signal; and
clock generating means for alternately producing said first clock indication signal and said second clock indication signal as a sequence of control signals for said sampling means and said gating means, respectively.

10. A data transmission error detection system as defined in claim 9, further comprising gate control means for generating window-defining gating signals corresponding to the length of a particular quantity of said incoming signals for enabling said gating means.

11. A data transmission error detection system as defined in claims 9 or 10, wherein said incoming signals are bi-polar signals, and further including pulse steering means responsive to a digitized version of said incoming signals for controlling said sampling means to operate on said incoming signals as separate streams, one of normal polarity, the other of inverted polarity.

12. A method of detecting errors in an incoming signal of a data transmission system comprising the steps of:
(a) repetitively sampling and averaging received data during successive sampling intervals occurring within the duration of a received data burst; and
(b) repetitively comparing received data with data averaged in step (a) and selectively generating an error indicating signal during successive comparison intervals that alternate with said successive sampling intervals.

* * * * *